July 13, 1943. E. L. KIBLER 2,323,917
TIRE CHAIN APPLYING TOOL
Filed June 6, 1941   2 Sheets-Sheet 1
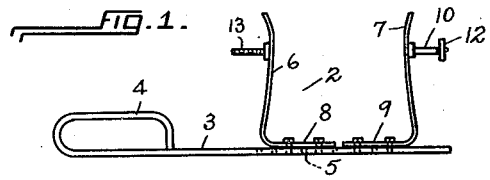
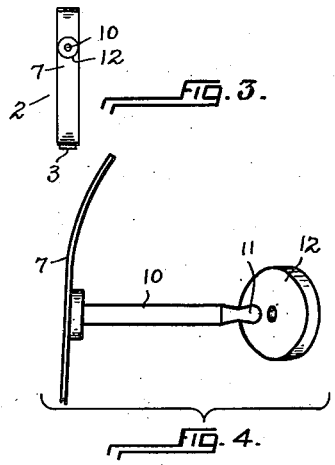
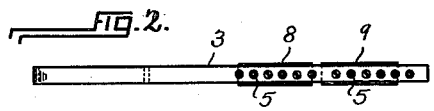
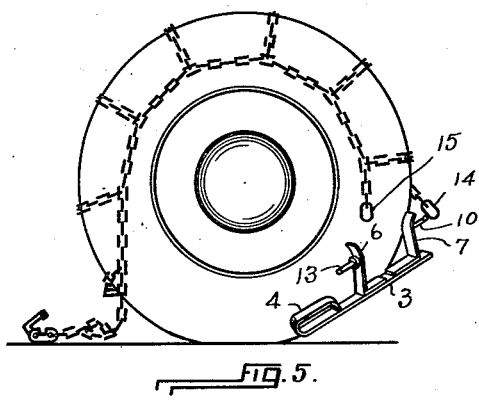
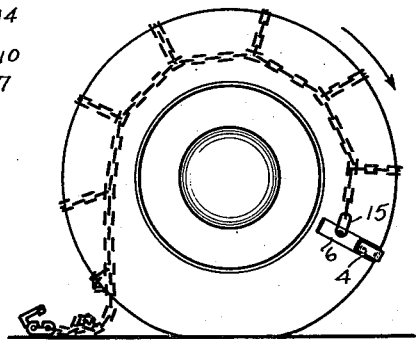
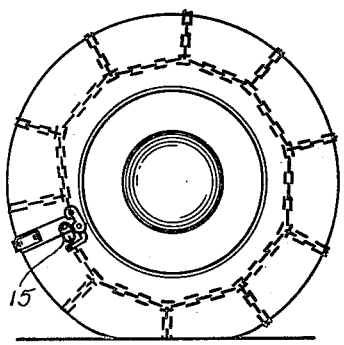
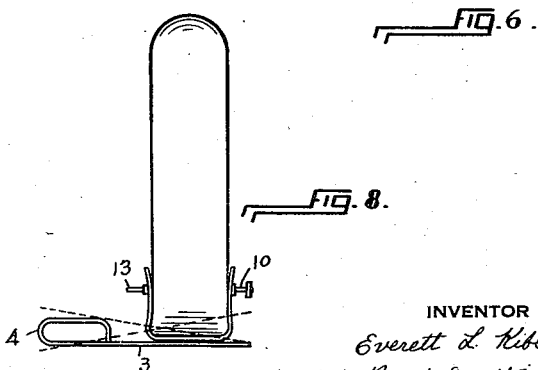
INVENTOR
Everett L. Kibler
by Christy Parmelee and Strickland
his attorneys July 13, 1943.  E. L. KIBLER  2,323,917
TIRE CHAIN APPLYING TOOL
Filed June 6, 1941  2 Sheets-Sheet 2

INVENTOR
Everett L. Kibler
by Christy, Parmelee and Strickland
his attorneys

Patented July 13, 1943

2,323,917

UNITED STATES PATENT OFFICE 2,323,917

TIRE CHAIN APPLYING TOOL

Everett L. Kibler, Pittsburgh, Pa.

Application June 6, 1941, Serial No. 396,876

1 Claim. (Cl. 81—15.8)

This invention is for a tool for applying antiskid chains to the tires of vehicle wheels and is for a tool of novel construction designed to facilitate the operation of applying tire chains.

Various tools have been designed for the purpose of aiding in the application of chains to tires. Many of these are in the form of clips adapted to be applied over the rim of the tire. They are designed to be applied to the lower rear portion of the tire after which the ends of the chains are attached to the clip and the vehicle is then moved forwardly to bring the chain over the top of the tire. The vehicle is usually moved forwardly a distance sufficient to rotate the wheel through substantially one complete revolution, bringing the tool back to approximately its starting position. Such devices, however, have not been highly satisfactory due to the fact that the chain is carried around the wheel without being under tension and the kinks in the chains are not straightened out and difficulty is encountered in bringing the ends of the side chains together. Another difficulty with such device is that the chain does not always follow around the wheel in the proper position and the side chains are therefore not located properly with respect to the periphery of the wheel. Unless the side chains are properly located on the tire with respect to the periphery, one side chain will be too long and the other too short.

According to the present invention there is provided a tool which contemplates a somewhat different manipulation of the chain and which is especially designed to facilitate such manipulation. In using the tool of the present invention the operator initially starts by draping the chain over the top of the wheel with the forward end of the chain a few inches above the ground. At this point the tool is engaged with the chain and clipped onto the tire. The car is then moved forwardly only a short distance somewhere between one-third and one-half of a revolution. Before the car is moved forwardly, however, the loose end of the portion of the chain extending up and over the wheel may be pulled around and the slack in the chain can be taken up and the kinks worked out. The clip forms an anchor for the forward ends of the chain while it is being thus manipulated. When the wheel has then been rotated between one-third and one-half of a revolution bringing the tool around to a position at the rear of the wheel, the chain is properly positioned on the wheel and is under tension. It is then a simple matter to disengage the ends of the chain from the tool and to fasten them together in the usual manner. The operation is accomplished in a very short period of time and with a minimum of annoyance to the operator.

My invention may be readily understood by reference to the accompanying drawings in which—

Figure 1 is a side elevation of the tool embodying my invention;

Figure 2 is a bottom plan view thereof;

Figure 3 is an end view;

Figure 4 is a fragmentary view on a large scale showing one form of chain-engaging lug;

Figure 5 shows the initial steps in applying the chain and using the tool;

Figure 6 is a view similar to Figure 5 showing the succeeding step;

Figure 7 illustrates the next step wherein the wheel has been moved forwardly approximately slightly over one-third of the rotation;

Figure 8 is a front elevation of the tool applied to the wheel indicating the manner in which the tool functions to automatically bring the ends of the side chains into proper position in a radial direction, i. e., inwardly from the periphery of the wheel;

Figure 9:
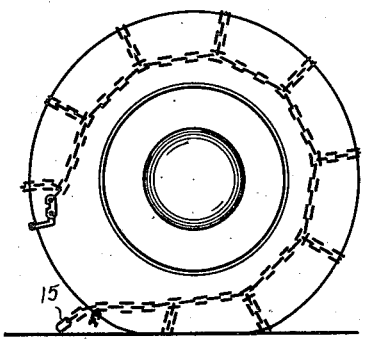
Figure 9 shows the position of the chain in Figure 7 after the tool is removed.
Figure 10:
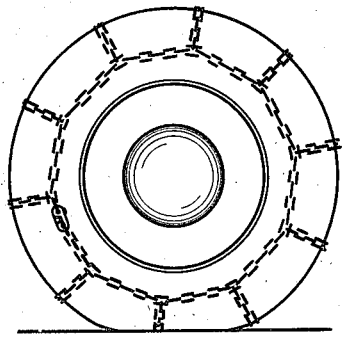
Figure 10 illustrates the chain completely applied.

Referring to the drawings in detail, and particularly with reference to Figures 1 to 10, inclusive, the tool has a clip portion and a base portion. The clip portion of the tool is designated generally as 2 and the base portion is designated generally as 3. The base portion comprises a straight flat strip of metal of a suitable thickness. One end of this strip of metal is bent around to form a handle 4. The remaining portion of the strip is flat and straight and is provided with a plurality of holes 5 spaced at half or quarter inch intervals. The clip portion is formed of two arms 6 and 7. These arms are preferably formed of a resilient flat strip stock and the arm 6 is provided with an inwardly turned foot portion 8 that sets on top of the base 3. It is bolted to the base as illustrated by bolts which pass through holes in the foot portion and through some of the holes 5 in the base.

The arm 7 has a similar foot portion 9 also bolted to the base. The series of holes in the base allow the arms to be adjusted for the size of the tire to which the tool is to be applied. As shown in Figure 1, the heads of the bolts are at the bottom of the base and are countersunk so as to be flush with the bottom. Extending laterally outwardly from the side of the arm 7 is a lug or pin 10. This pin is illustrated as having a ball-shaped terminal portion 11 over which a removable rubber disk may be snapped. This rubber disk is designated as 12.

Projecting laterally from the exterior of the arm 6 in line with the stud 10 is a stud 13 which may have a threaded surface or may be otherwise roughened. For convenience in use the studs 10 and 13 are of substantial length. The distance from the base of the clip to the studs is substantially equal to the distance from the periphery of the tire to the location on the side wall of the side chains.

In using the tool the chain is draped over the tire to which it is to be applied as shown in Figure 5 with the front ends of the chain clear of the ground. For purposes of illustration Fig. 5 shows the ends of the chain slightly higher than would normally be convenient, but the exact point of application is not critical and the operator quickly learns the most convenient position for his particular car. The operator holding the tool by the handle 4 applies the front end of the inner side chain, designated 14, to the stud 10. He may then slip the washer 12 into place to prevent the accidental removal of the chain from the pin 10. When this has been done the clip is slipped onto the tire and the end 15 of the outer side chain is slipped over the stud 13. By having the stud 13 roughened the chain is not likely to slip off the stud but if the roughening is in the form of a thread a removable nut may be used to provide an abutment or, if preferred, the pin 13 may be the same as the pin 10 and a rubber disk used to provide an abutment to retain the chain link on the pin. Also the pin 10 may be roughened or threaded similarly to the stud 13. When this has been accomplished the tool is in the position shown in Figure 6. Because of the fact that the tool is applied to the chain at the front of the tire where the tire is close to the fender and to the running board, the extension 3 with the handle 4 enables this operation to be performed quickly and conveniently whereas without the extension and the handle the application of the tool to the tire at this position would be more difficult and dirty.

When the ends of the chain have been thus anchored to the tool and the tool clipped over the tire, the operator may take the cross chains which are over the tire and pull them toward the rear and easily work out any kinks in the chain so that all of the available slack in the chain is worked around to the rear of the wheel. The vehicle is then moved or pushed forwardly sufficiently far to rotate the wheel about one-third of a revolution, bringing the tool to the position shown in Figure 7. If the tool has not been properly applied to the wheel but has been applied at an angle as indicated by the dotted lines in Figure 8, the rolling of the wheel over the tool will cause the base to be flattened down to a position where it is tangent in a crosswise direction to the periphery of the wheel and the side chains will be automatically positioned the right distance from the periphery of the wheel.

After the car has been moved forwardly to bring the tool to the position shown in Figure 7, any one of a number of methods of joining the ends of the chain together may then be followed. One simple procedure is to slip the ends of the chain off the respective pins 10 and 13 and completely remove the tool from the tire. The ends of the inner side of the chain are then hooked together after which the ends of the outer side chain are hooked together. Another equally convenient procedure is to disconnect the end of the inner side chain from the pin 10 and partially connect the two ends of the inner chain and then remove the end of the outer side chain from the pin 13 and remove the tool from the tire, after which the ends of the inner and outer side chain are finally joined.

By using two of the tools at one time, one on each wheel, it is possible to quickly apply both chains with only one forward movement of the car, and the tools are of such economical construction that they can be cheaply acquired in pairs. While the preferred method of using the tool contemplates that the chain be applied without using a jack, the tool will nevertheless be of substantial aid in service garages and other places where the wheels are jacked up.

Figure 11:
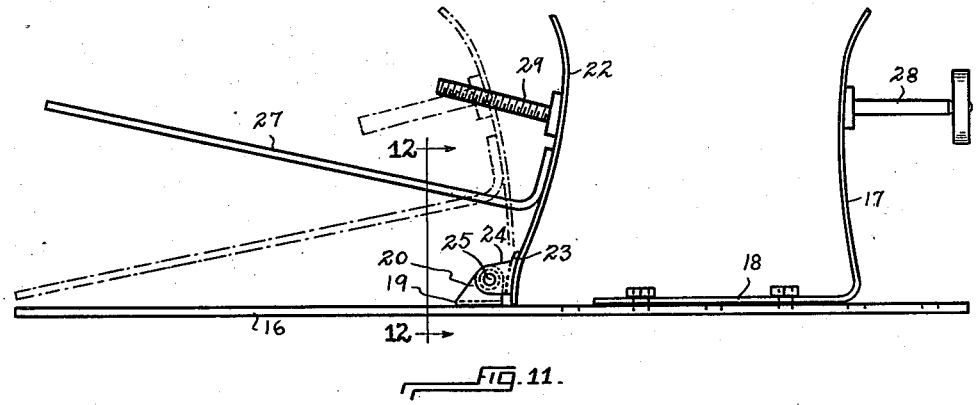
Figure 11 is a view similar to Figure 1 on a somewhat larger scale showing a modified construction.
Figure 12:
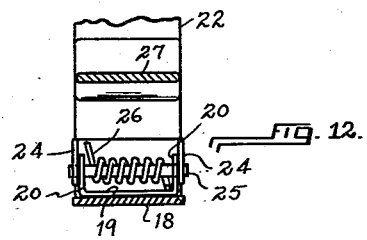
Figure 12 is a detail of a hinge used in the modification of Figure 11.

While the clip portion of the tool may conveniently be formed with resilient arms made of spring metal so as to frictionally engage the side walls of the tire when the tool is clipped thereto, the same result may be conveniently achieved by making only one of the arms resilient as shown, for example, in the modification illustrated in Figures 11 and 12. In this modification 16 designates a base member of a flat strip metal having secured thereto an arm 17 with a base portion 18 which sets on the base strip 16 and is bolted thereto, adjustable bolts as previously described being preferably used. Properly positioned on the base 16 is a member 19 having a pair of ears 20 forming one part of a hinge for pivotally supporting an arm 22. The arm 22 has a member 23 thereon with outwardly extending ears 24 providing the other part of the hinge. A pintle 25 passes through the ears of the hinge portions to pivotally support the arm 22 on the base strip. A torsion spring 26 is provided about the pintle for resiliently urging the arm 22 toward the arm 17. Welded or otherwise secured to the arm 22 and extending laterally therefrom is an extension 27 which projects over the laterally extending handle portion of the base member 16. The arm member 17 is provided with a stud 28 corresponding to the stud 10 and the arm member 22 is provided with a stud 29 corresponding to the stud 13 of Figure 1.

The tool is used in the same manner as the tool shown in Figure 1 except that in applying and removing the tool to the tire the handle-forming extension of the base member 16 and the member 27 are squeezed, moving the handle 27 from the full line position shown in Figure 11 to the dotted line position, thus opening the clip and making it easy to apply or remove it.

In both forms of the tool there is provided a base member in the form of an elongated flat strip having a clip secured thereto adjacent one end and having a handle-forming extension. In both forms of the invention there is a resilient tire engaging clip with each arm of the clip provided with an outwardly extending lateral pin or stud. Both forms of the tool are especially designed to facilitate the application of the tool to the tire at the point indicated in Figure 5.

The projections 10 and 13 and 28 and 29 allow the chain link which is fitted thereover to freely pivot thereon. They are long enough so that once the pin or projection has been engaged with the chain, the chain will not be likely to slip off. At the same time the chain can be easily disengaged without the operator being able to see what he is doing but merely by feeling.

While I have illustrated and described certain specific embodiments of my invention, it will be understood that the invention is not limited to the particular construction and arrangement of parts therein shown but that various modifications and changes may be made within the contemplation of the invention and under the scope of the following claim.

I claim:

A tire chain-applying tool comprising a straight base member adapted to be placed crosswise of a tire and tangentially thereto, a pair of arms non-rotatably mounted on the base member, at least one of said arms being resilient, said arms being adapted to embrace the sides of the tire, and an outwardly extending laterally projecting chain-engaging stud on each arm, said base member being substantially longer than the maximum distance between the arms to provide an extension at one end of the tool in the nature of a handle to facilitate the application of the tool to the tire.

EVERETT L. KIBLER.